United States Patent [19]
Vincent

[11] 3,952,169
[45] Apr. 20, 1976

[54] SOLID STATE LINE CIRCUIT FOR A KEY TELEPHONE SYSTEM

[76] Inventor: Ogden W. Vincent, 147 S. Kingsley, Anaheim, Calif. 92806

[22] Filed: Oct. 15, 1974

[21] Appl. No.: 514,580

Related U.S. Application Data

[63] Continuation-in-part of Ser. No. 349,533, April 9, 1973, abandoned.

[52] U.S. Cl. ................................................ 179/99
[51] Int. Cl.² ........................................... H04M 1/00
[58] Field of Search ............ 179/81 R, 81 C, 84 R, 179/84 L, 18 F, 99

[56] References Cited
UNITED STATES PATENTS

| | | |
|---|---|---|
| 3,676,608 | 7/1972 | Goldthorp et al ................. 179/81 R |
| 3,764,752 | 10/1973 | Yachabach ........................ 179/81 R |
| 3,766,325 | 10/1973 | Hatfield et al ........................ 179/99 |

*Primary Examiner*—Thomas A. Robinson

[57] ABSTRACT

This solid state line circuit employs transistors, diodes, optical couplers, triacs, and other solid state components but no relays. It is designed to replace line cards in key telephone systems. This design utilizes semiconductors that are the "state of the art" such as optical couplers, SCRs and Triacs to replace relays. The circuit achieves the isolation and breakdown voltages required where other designs have failed.

7 Claims, 3 Drawing Figures

SOLID STATE LINE CIRCUIT FOR A KEY TELEPHONE SYSTEM

This application is a continuation-in-part of application Ser. No. 349,533 which was filed on Apr. 9, 1973 and was later abandoned.

BACKGROUND OF THE INVENTION

1. Field of the Invention

This invention is to be used in key telephone systems and other such push button systems. It is used to control the signals associated with the various lines going to and coming from a key telephone.

2. Description of the Prior Art

In the past line circuits have been designed around relays because they provide the isolation required of the telephone lines. In particular the incoming T (tip) and R (ring) require a large degree of isolation from other circuitry. Without this high degree of isolation, noise is introduced into the telephone lines.

It is common practice in the telephone industry to ring a station with a large 20 cycle AC voltage of approximately 100V R.M.S. To detect this signal a relay coil is utilized which provides isolation and immunity to large voltages such as the 100V of ringing. Since the coil floats with the line, it introduces no noise.

To detect the line current when a party goes off hook, a relay coil is also used. The line current operates the relay when DC current flows through the coil. Here, again, the relay coil floats with the line providing isolation to the line.

For terminating the line when the station party goes on hold, isolated relay contacts close to insert a resistor between T and R. The relays are actuated by logic signals and drivers. The line isolation of the T and R is achieved by the isolated relay contacts. Freedom from large line transients is also achieved.

In addition to the above, the same relays control audible and visual signals for local ringers and lamps. The contacts of these relays control large AC signals such as 100V AC for the ringer. These signals are isolated from other circuitry by the use of isolated contacts. The motor of the interrupter is also controlled by one set of contacts.

The logic and drivers for the relays utilize various logic schemes such as additional relays, transistors, diodes, and integrated circuits. The contacts of the relays are utilized extensively to form the logic by having the power or signals go from one relay to another.

SUMMARY OF THE INVENTION

The solid state line circuit performs all the functions of a relay type line circuit. The solid state devices that are substituted for the relay coils and contacts are optical couplers and thyristors. High voltage transistors and thyristors are used with the optical couplers as the output devices.

More specifically, an optical coupler is used to detect the DC line current that flows when the telephone is off hook or when the line is terminated. The detected signal is then used as part of the logic.

An optical coupler is used to turn on the termination across the T and R leads when the station party goes on hold. This optical coupler provides the isolation necessary for the telephone line.

An optical coupler is used to detect the 20 HZ ringing voltage across the T and R leads. The detection is done on a bridged basis T and R, and the isolation is again preserved. The termination and 20 HZ detection circuits work in conjunction with one another in a unique fashion.

The RC (ring control) circuit utilizes an optical coupler to turn on an SCR. The coupler and SCR then float with the 100V signal.

The L (lamp) lead and the ST (motor) lead are each turned on by a TRIAC which is a direct substitute for relay contacts. The remainder of the circuitry is the logic circuitry which is composed of solid state components which are used to interface these various input and output devices. These transistors form the logic and delays required of the line circuit as well as the current multiplication required for driving the output stages. The logic circuitry includes a time-cut sub-circuit and a holding sub-circuit.

BRIEF DESCRIPTION OF THE DRAWING

FIG. 1 comprises two sheets titled 1A and 1B. The inputs and outputs are labelled in the normal nomenclature of a key telephone line card.

DETAILED DESCRIPTION

Figure 1A:
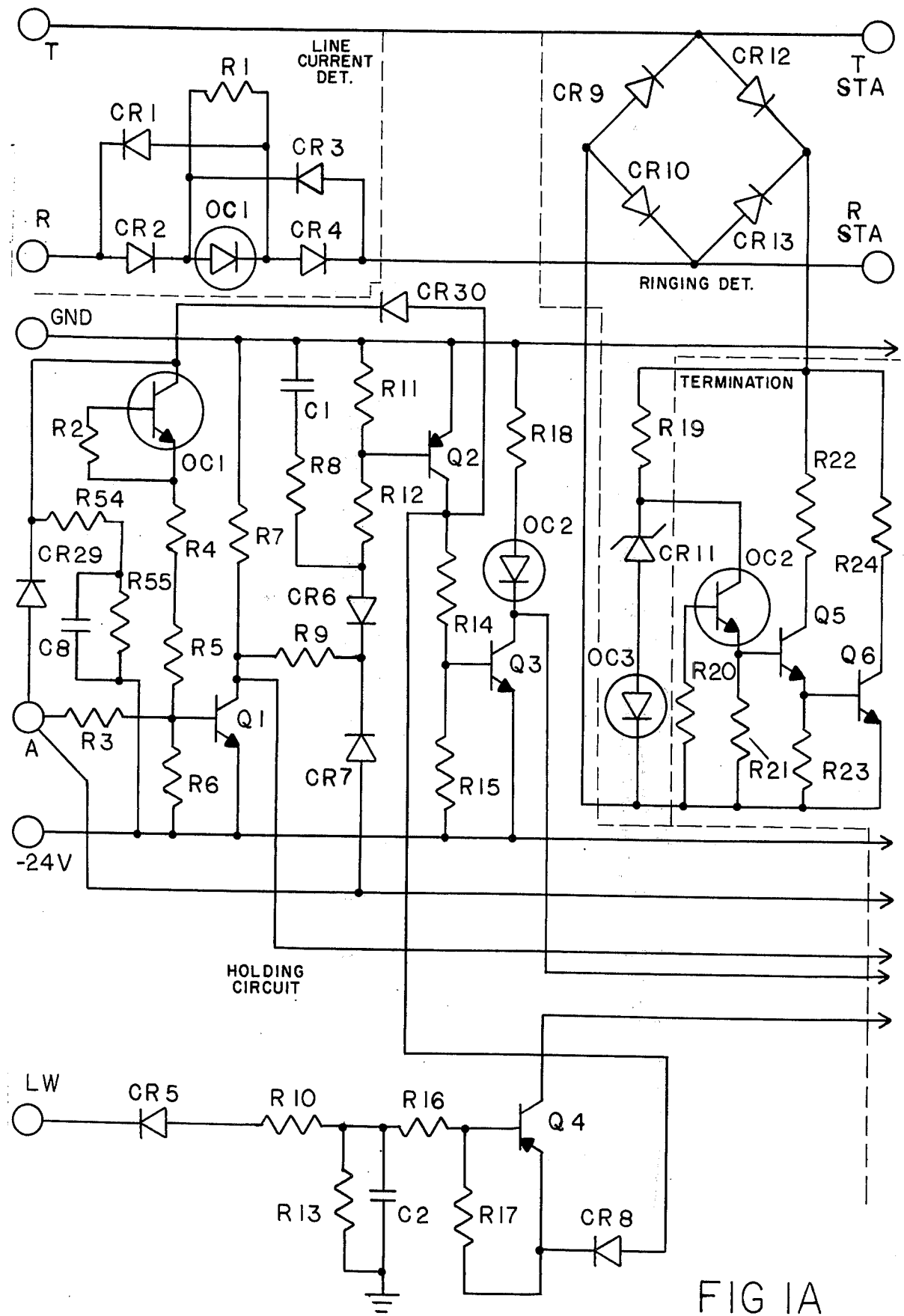
FIG. 1 is a schematic diagram of a solid state line circuit.

The line from the central office connects to the T (tip) and the R (ring). A key telephone set connects to the T-Sta and the R-Sta. A local battery is connected to −24V and GND terminals. A local 100V 20 HZ supply is connected at the terminal marked 100V AC, and a local 10V 60 HZ supply is connected to the terminal marked 10V AC. Terminal LG is the lamp ground which is the ground side of the 10V AC. the LW terminal is the 10V AC supply after being put through a rotating commutator which turns the AC on and off periodically for "lamp winking." The LF terminal is also the 10V AC supply after being put through another rotating commutator for "lamp flashing." Terminal A connects to the A lead of the key telephone which connects to ground when the telephone is off hook and is open when the telephone is on hook or on hold.

A ringer or buzzer is connected between the RC lead and the 100V AC return. The motor of the interrupter is connected between the ST terminal and the 10V AC supply. A lamp is connected between the L terminal and the 10V AC return which is also ground. The terminal marked LOGIC is for the purpose of expansion to a DC outside control system and is not needed presently. It can be used to turn the ringing on and off periodically.

20HZ ON LINE — INCOMING CALL

In the idle state all the transistors are off except one which is Q8. This transistor draws a small standby current. None of the other circuitry draws any power from the −24V supply until the telephone line is used. When the station is being called, 20HZ at 100V is applied to the T and R. This large AC voltage plus the −48V office battery is passed through diode bridge CR9, CR10, CR12, and CR13 so that the plus voltage appears at R19, a limiting resistor. When the absolute voltage between tip and ring exceeds the 62V breakdown voltage of CR11, a zener diode, current will flow through R19 and the diode of OC3, thus detecting the ringing voltage. The transistor of OC3 will turn on charging C3 through R26 with a known time delay, before turning on Q7. The two transistors Q7 and Q8 in conjunction with R36, R37, R32 and R28 form a differential amplifier. When OC3 is off, Q8 conducts, the base being biased up by R36 and R37. When OC3 is on, Q7 conducts after C3 charges to exceed the emitter voltage of Q8. CR18 increases the breakdown voltage of the circuit. C3 continues to charge to almost 0 volts. Q9 and Q10 turn on when Q7 turns on. R31 and R42 are hold-off resistors for Q9 and Q10. R40 and R41 are current limiting resistors for Q9 and Q10.

Some of the collector current of Q10 passes through the diode of OC4 causing the transistor of OCH to conduct. Current from the emitter of OC4 turns on Q12 which acts as a switch between the RC and 100V AC terminals. CR23, CR24, CR26, and CR27 act as a current steering bridge since Q12 is only a unilateral thyristor. These four diodes make sure that positive current goes into the anode of Q12. The collector of OC4 is protected from high voltages in the off state by diodes CR15 and CR16. Resistor R38 limits the current through these diodes as well as OC4. R35 and R39 are hold off resistors for OC4 and Q12. Protection against sharp rise times of the 100V AC supply by a commutator is given by L1, C4, R52 and C6. Resistor R52 limits C4 current thru Q12 when Q12 turns on. L1 and C4 act as a filter to reduce the rise time. C6 holds the gate off. Q12 has a very high breakdown voltage to prevent breakdown in the off state.

The rest of the collector current from Q10 passes through CR21 and R47 into the gate of Q14 which turns on. CR21 and CR22 form an OR gate. Q14 acts as an AC switch to turn on the motor. R48 acts as a hold off resistor for Q14 in the off state. C7 and R51 act as a transient suppressor to prevent the triac from retriggering during the commutation period.

Part of the collector current from Q9 is directed through CR20 to the emitter of Q11. Transistor Q11 turns on when a 10V AC signal is present on terminal LF. Diode CR14 conducts on the negative half cycle of the AC waveform, charging C5 through R29. Current from C5 flows through R33 into the base of Q11, turning it on. Then current from Q9 passes through Q11 and R45 into the base Q13 turning it on. The collector current from Q13 goes through a current limiting resistor R49 into the gate of Q15 which turns on. Triac Q15 acts as an AC switch between the lamp on L and the 10V AC supply. Resistor R30 discharges C5 when the AC voltage on LF disappears during commutation periods. R34, R46 and R50 are hold off resistors that turn off Q11, Q13 and Q15 respectively when there is no signal on LF. R33, R45 and R49 are current limiting resistors for Q11, Q13, and Q15.

Transistors Q5 and Q6 have very high breakdown voltages to withstand the high AC + DC voltages on the line. The OC2 transistor collector is protected from these high voltages by CR11. Diodes CR9, CR10, CR12, and CR13 have very high breakdown voltages also.

TIME OUT — 20 HZ OFF

When the 20HZ AC signal stops on the T and R, the zener diode CR11 and OC 3 diode stop conducting current. The transistor of OC3 turns off with R25 holding off the base. C3 then begins a slow discharge through R28 to −24V. C3 is a large capacitor and R28 is a very high resistance so the discharge lasts up to 13 seconds before the voltage on the base of Q7 falls low enough so that Q8 conducts. When Q7 turns off the following devices turn off: Q9, Q10, Q11, Q12, Q13, Q14, and Q15 and OC4.

Normally the ringing on the T and R is repetitive with a 6 minute cycle. Transistor OC3 is on for 2 seconds and off for 4. C3 is constantly being recharged, and Q7 stays on until the party answers. In the event of only one ring or the last ring on the T and R, transistor Q7 turns off.

ANSWERED CONDITION

When the station party comes off hook to answer an incoming call, the telephone terminates the T-Sta and R-Sta line which causes DC current to flow in the line. This DC current trips the ringing from the central office, and it provides a DC signal source by flowing through the diode of OC1. Diode bridge CR1, CR2, CR3 and CR4 are steering diodes to insure that the current flows into the anode of OC1 since line current could be in either direction. Resistor R1 is a threshold resistor, keeping OC1 off for small currents such as the ringing current.

At the same instant that the phone comes off hook, A is grounded. Current flows through R3 into the base of Q1 turning it on. Q1 collector current flows through R7, R9, CR7 and CR17. Logic A clamps R9 to ground via CR7 so Q2 remains off. Diode CR17 pulls the base of Q7 to −24V turning it off. R27 limits the current through CR17. Ringing on RC stops because Q7, Q9, Q10, OC4 and Q12 are turned off. The motor on ST stops because Q14 goes off. Transistor Q15 is now on, being turned on by Q13 and signal A. Current flowing through CR19 and R43 into the base of Q13 turns it on.

The transistor OC1 was turned on by the line current. Current from the OC1 emitter flows through R4 into the base of Q1.

OUTGOING CALL

The telephone goes off hook as in the "Answered Condition" above. The circuit does not distinguish between the two conditions except that there has been no 20HZ signaling on the line. That means all the transistors except Q8 were off before the telephone was taken off the hook.

When A is grounded by the telephone set, current flows into the base of Q1 through R3 turning Q1 on. CR7 clamps R9 at ground preventing Q2 from coming on. Current also flows through CR19 and R43 into the base of Q13 turning it on. Transistor Q13 turns on Q15.

The station party proceeds to dial by interrupting the DC line current at 10 pps. This pulsing does not interfere with the circuit operation because signal A is present at this time to hold Q1 on. The circuit passes the DC pulsing with no distortion, there being but three diode drops in the line voltage caused by the diode bridge CR1, CR2, CR3, CR4 and OC1.

ON HOLD CONDITION

For this condition the station party has answered and then has gone on hold by pressing the hold button. A is open circuited. The line remains terminated for a period of time by the telephone before it is open circuited. OC1 and Q1 remain on due to the current flowing in the line. Current flows thru R9 and CR6 into R12, R8 and Cl, forming a time delay network. Capacitor C1 charges after which Q2 turns on. Some of the collector current of Q2 flows through R14 turning on Q3. Collector current then flows through the OC2 diode and limiting resistor R18, turning on transistor OC2.

Optical coupler OC2 provides a very high voltage isolation between the logic circuitry and the line circuitry. Transistors OC2, Q5 and Q6 obtain their current from the line. Zener diode CR11 protects transistor OC2 from high line voltages. R19 limits the current through CR11 or OC2.

Emitter current from OC2 turns on Q5. Emitter current from Q5 turns on Q6. Resistor R24 is a low ohmic value used to terminate the line since Q6 saturates. R22 limits the current thru Q5. Resistors R20, R21 and R23 are hold off resistors used to turn off OC2, Q5 and Q6 respectively.

Part of the collector current of Q2 is directed to the emitter of Q4 thru diode CR8. When 10V AC is present on LW, current flows into C2 on the negative half cycle through CR5 and R10. C2 acts as a filter, remaining charged during the positive half cycle. Thus Q4 is turned on by the current from C2 through R16. Collector current from Q4 flows through R44 into the base of Q13 which goes on. Collector current from Q13 flows through R49 into the gate of Q15, turning it on.

Part of the collector current from Q3 flows through CR22 and R47 into the gate of Q14, turning it on.

If line current stops momentarily while on hold, C1 will hold Q2 on for up to 50 msec even though Q1 goes off. If line current stops entirely, C1 will discharge and all the transistors will turn off except Q8. The components CR29, CR30, R54, R55 and C8 are for the purpose of adding logic to prevent the circuitry from going on hold during ringing when a 20Hz bell is attached to R Sta and T Sta. Normally C8 is at −24V being discharged by R55 so that no current can flow through transistor OC1 and R4 into the base of Q1. Thus a large 20Hz current on the line would not cause Q1 to come on even though OC1 turns on. After A appears C8 is charged to zero volts through diode CR 29. Capacitor C8 furnishes the current for transistor OC1 to go on hold when A disappears as previously explained. The discharge time constant R4 C8 is longer than R9 ∥ R12 C1. Thus Q2 will pull in before Q1 drops out and the circuit will hold on itself through CR30 while the on hold condition exists.

COMING OFF HOLD

After being "ON HOLD" the condition of the transistors is as stated under that section. Then A is grounded providing more base current for Q1 through R3. Diode CR7 pulls R9 to ground, back biasing CR6. Capacitor C1 discharges through R8 and R12 toward ground. When the current through R12 equals the current thru R11, Q2 will turn off. Thus C1, R8 and R12 act as a delay. When Q2 goes off, Q3, Q4, OC2, Q5, Q6 and Q14 all go off.

Ground on A makes current flow through CR19 and R43 turning on Q13. Q13 collector current turns on Q15.

DISCONNECTION — ON HOOK

When all stations go on hook, line current ceases to flow, and the A lead is disconnected from ground simultaneously at the switch hook. The A lead must be ground or in the answered state before disconnection. If not, the circuit is on hold and will stay on hold. After going on hook, Q1, Q13, Q15, and OC1 turn off, all other transistors except Q8 being already off.

ABANDONED CALL

If an incoming caller is left on hold or abandoned, the line will remain on hold. However, the operator or CO may drop the line circuit from the on-hold condition merely by opening the line for a period of time. Then C1 will discharge and all transistors will go off except Q8.

LOCAL POWER FAILURE

In the event of a local power failure, the logic network ceases to function. The circuit as a whole ceases to operate. The line itself is still usable if the source of line current for talking is a battery such as a central office battery. If line current is available, talking and dialing is not interrupted. However, incoming 20 cycle signals can only be detected from a line connected to the CO. A line ringer is required to detect the 20 cycles which requires a normal telephone. The circuit does not interfere with these line functions when local power is off.

KEY TELEPHONE SYSTEM DESCRIPTION

Figure 1B:
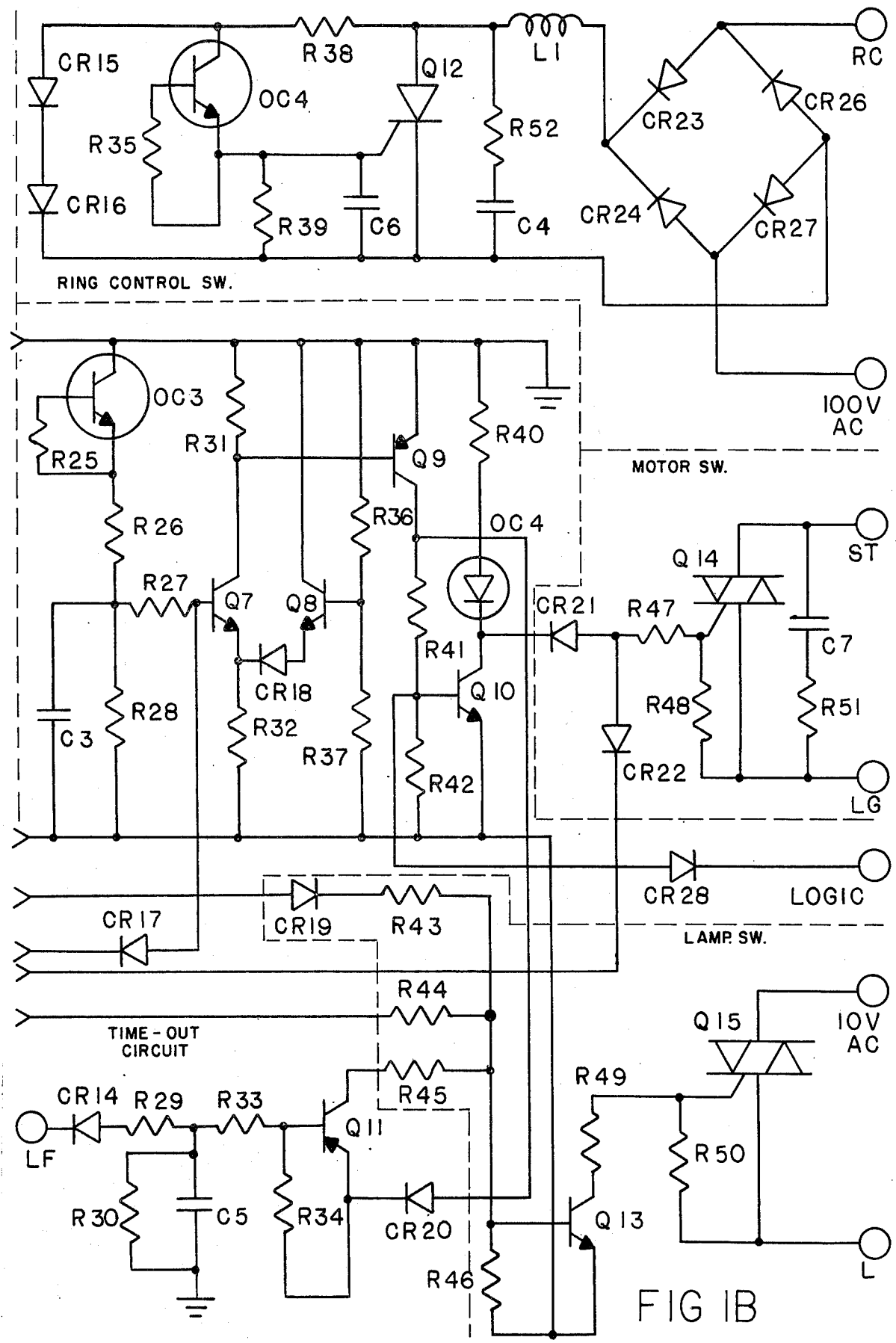
Figure 2:
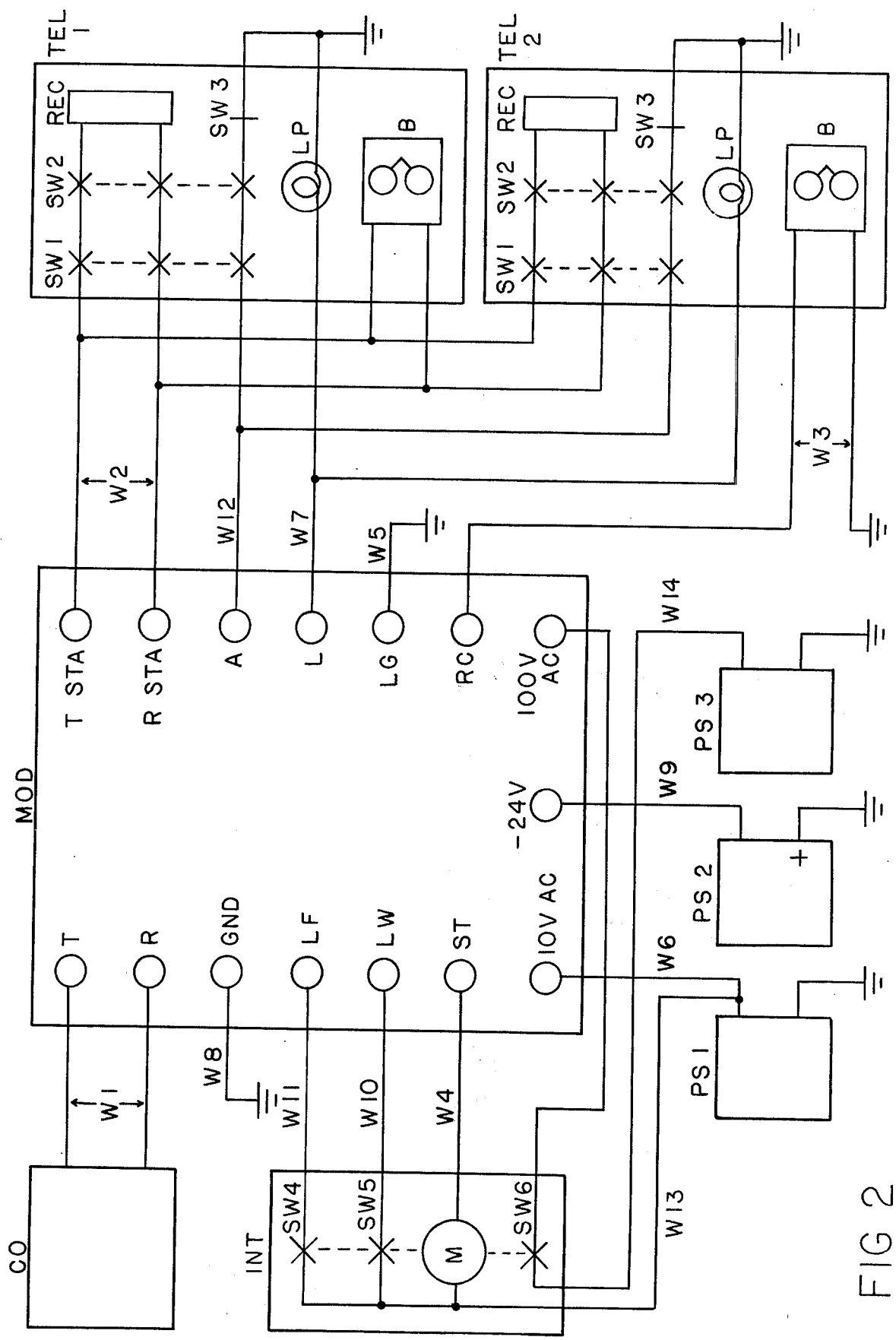
FIG. 2 is a typical key telephone interconnection block diagram.

A block diagram of a typical key telephone system is shown in FIG. 2. In the center of FIG. 2 is shown the solid state line circuit designated MOD, which is on a module with terminals corresponding to those shown on FIG. 1. The central office or CO is connected to T and R on MOD via telephone line W1. The interrupter INT is connected to MOD via wires W4, W11, and W10. W11 connects SW4 on INT to LF on MOD. W10 connects SW5 on INT to LW on MOD. W4 connects ST on MOD to M on INT. The interrupter consists of a motor M, and three commutator switches which are a flashing switch SW4 and a winking switch SW5, and SW6. W13 supplies 10V AC to the interrupter from the 10V AC power supply PS1. PS1 also connects to 10V AC on MOD via wire W6. The −24V power supply is PS2 which connects to −24V on MOD via wire W9. The 100V AC ringing supply is PS3 which connects to 100V AC on MOD via wire W14 and via SW6 on INT. The station telephone line coming from T Sta and R Sta on MOD is wire pair W2 which connects to key telephone set TEL 1 and to key telephone set TEL 2 in parallel. In TEL 1 pair W2 connects to the receiver REC after going through two switches, SW1 and SW2. Switch SW1 is a key push button switch that selects line W2, there being other key push buttons for station telephone lines from other modules not shown in FIG. 2. Depressing SW1 connects line W2 to switch SW2. Switch SW2 is the cradle switch which closes when the handset is lifted off the cradle, whereby the receiver REC is connected to W2. Wire W12 connects terminal A on MOD to the so called "A lead" of TEL 1, which connects to ground via switches SW1, SW2, and SW3. Switch SW3 is the hold push button which is normally closed, opening momentarily when it is pushed in. When SW3 is released, the mechanical action releases SW1, producing a hold condition. The lamp LP of TEL 1 connects to ground on one side and to L of MOD on the other side via wire W7. The bell ringer B of TEL 1 is connected to pair W2 and is normally rung by CO ringing voltage of 100V. Key telephone set TEL 2 has functions similar to TEL 1. The receiver of TEL 2 connects to pair W2 via switches SW1 and SW2 of TEL 2. The "A lead" of TEL 2 connects to W12, also. The lamp LP of TEL 2 connects to W7. However, the bell ringer B of TEL 2 connects to pair W3, one wire going to RC on MOD and the other wire going to ground. Usually, TEL 2 is located at a receptionist who monitors all the telephones. Thus, RC of one MOD is connect to RC of another MOD. Everything in FIG. 2 is considered local except the CO which is remote. The CO connects a talking battery and a 100V of AC ringing voltage to the telephone line from a remote location. Talking currents may come from a very remote location via the telephone lines to the CO, to W1, to MOD, to W2, and finally to a REC of TEL 1 or TEL 2.

RELIABILITY

The ultimate goal of the solid state line circuit is a design that will not fail for a very long time, a goal of 20 years being required to satisfy the telephone companies. The elimination of the mechanical relays was the first step. However, substitution of solid state devices has not been easy in the past because heavy transients have shown solid state devices to be vulnerable and unreliable devices. Good circuit design can protect these vulnerable components. Having approached these problems in the past, the designer has attempted to reach the twenty year life goal by close attention to design.

The elimination of the relays is accomplished and demonstrated by the circuit shown in FIG. 1. By using both NPN and PNP transistors, the designer was able to have all components, except Q8, inactive when the telephone line is inactive. Since the telephone line is used quite intermittently, the life of each component is greatly increased by the time off to the time on.

To achieve success over line transients, complete isolation of the line is achieved by the use of optical couplers OC1, OC2, and OC3. By the use of a diode bridge containing CR1, CR2, CR3, CR4, the diode of OC1 is protected from large back voltages. By the use of a diode bridge containing CR9, CR10, CR12 and CR13, OC3, OC2, Q5 and Q6 are protected from large back voltages. The transistor of OC2 is protected from excess collector voltage by the diode of OC3 in series with zener diode CR11. Transistors Q5 and Q6 have a 300V BVCEO. Thus, transients of 200V in either direction between T and R will not cause component failure of the line circuitry. Transients of up to 1500 volts from T or R to ground will not cause failure due to the 1500V insulation breakdown voltage between the input and output of optical couplers.

The transients caused by the inrush currents of the lamps are a big killer of components. Up to 20 lamps can be connected to terminal L, causing an inrush current of up to 16 amperes. Added to this cause of failure is a repetitive switching or bounce caused by the interrupter switches. The inrush current can be switched many times in present solid state designs where the voltage at LW or LF is used directly by a triac. This solid state design isolates the bounce voltages at terminals LW and LF by two capacitors, C2 and C5 respectively. Thus, triac Q15 is switched on only once for each turn on, a great improvement in reliability. since only small triacs are feasible in a design such as this, the elimination of bounce is important. A heat sink is also very important to keep components within heat limitations, also very important when handling a large inrush current in a small triac.

The achievement of a floating switch of high reliability for the ringer on RC proved to be very difficult. Relatively small high voltage transistors, switching heavy currents, have always been subject to failure. Triacs are not yet feasible for such an application because of excessive currents required by the gate. Since the turn on current has to come out of the RC lead or ringer, it has to be small. The SCR is the answer, and an SCR is reliable. A 200 $\mu$a turn on current is easily supplied by OC4, and the 200 $\mu$a drain on the ringer is easily obtained. A small SCR is the best state of the art solution for reliability.

It must be evident that over half the transistors have to be discrete devices to be reliable, since they carry currents between 5 ma and 100 ma in a saturated state. These transistors are Q3, Q5, Q6, Q10 and Q13. The diodes of optical couplers require at least 5 ma to reliable turn on. Discrete transistors are more reliable when large currents are switched. Perhaps this design could have been done with fewer transistors, but from the standpoint of reliability this is not a good practice. All throughout the circuitry the transistors were derated to a requirement of Beta = 20. Special low level transistors are used in those positions operating at low current levels. Special transistors are used for Q5 and Q6 requiring 300V ratings as well as high current ratings.

Besides catastrophic failure, operational failure must also be considered. Excessive noise caused by insufficient isolation between the telephone line and ground is intolerable. One of the primary objects of this design is to isolate the line from ground so that telephone company requirements are met. This isolation is satisfied because each optical coupler has an isolation of $10^{11}$ ohms and 1 pf between input and output. Therefore, noise levels of −10 dbrnc or less are obtained, and balance to ground of over 80 db is easily obtained when measuring at T Sta and R Sta with a 500 ohm resistance between T Sta and R Sta.

Another design objective is to reduce the bridging leakage between T and R to almost zero. This design objective is met by having nothing but the leakage currents of the semiconductors which are back biased and off. Most other line circuits have a relatively low impedance between T and R in order to detect the ringing voltage. This line circuit design is a vast improvement over previous designs, the leakage being less the 1 $\mu$a while talking. Furthermore, noise caused by leakage between T and R is eliminated.

False ringing due to transients between T and R is suppressed by capacitor C3 and resistor R26 which form a delay before transistor Q7 becomes forward biased. Optical coupler OC3 will not come on until a voltage of over 60V exists between T and R due to the zener diode CR11.

Line transients from T or R to ground do not cause false ringing because there is a 1500 volt isolation breakdown rating for each optical coupler between the input and output. An optical coupler will cause no output until detectable current flows through the diode section.

Inadvertent dropout of the hold circuit is prevented when the line current is momentarily opened by a CO switching operation. Capacitor C1 becomes charged by current from the collector of Q1 before transistors Q2 and Q3 are biased on. If OC1 goes off momentarily, C1 holds Q2 on for a certain period of time, thus preventing dropout. It is also possible that a line transient may momentarily cause the line current to go through zero. C1 prevents the hold circuit from dropping out.

The improvements in reliability encompass all aspects of a line circuit causing a failure. Telephone companies are equipped to test line cards both environmentally and operationally. If any one of the areas mentioned above do not meet their requirements, it is considered a failure. So, up until this new design for a solid state line card, there has not been a solid state design which has satisfied the reliability requirements of telephone companies.

It is to be understood that the embodiment described herein is merely illustrative of the principles of the invention. Various modifications thereto may be effected by persons skilled in the art without departing from the spirit and scope of the invention.

What is claimed is:

1. In a key telephone system a solid state line circuit comprising, in combination, a pair of conductors connected at one end to the tip and ring lines from a central office having an office battery and a ringing voltage source and connected at the other end to the receiver, transmitter and ringer of a first key telephone and to the receiver and transmitter of a second key telephone, an ungrounded isolated solid state line current detector means connected in series with the first conductor of said pair at the central office end, said line current detector means being responsive to line current of either polarity for activating an optical coupler when the current exceeds a predetermined quantity, an ungrounded isolated solid state ringing detector means connected between said pair at the station end for activating an optical coupler, said ringing detector means being responsive to either polarity of voltage between said pair when the absolute voltage exceeds the voltage of said office battery by a predetermined quantity, an ungrounded isolated solid state termination means connected between said pair at the station end, said termination means being responsive to logic circuitry means via an optical coupler for terminating said tip and ring line with either polarity of line current when an on-hold condition exists, an ungrounded isolated solid state ring control switch for switching a local ringing supply to the ringer or buzzer of said second key telephone, said ring control switch means being responsive to said logic circuitry means via an optical coupler, a solid state motor switch means for switching the motor of the interrupter from central to a local power supply, said motor switch means being responsive to said logic circuitry means, a solid state lamp switch means for switching the lamps of said first and second key telephones to a local power supply, said lamp switch means being responsive to said logic circuitry means, for reliability the activation of said lamp switch means being continuous during the time the lamps of said first and second key telephones emit light, said logic circuitry means using the output of said ringing detector means, the output of said line detector means, signal A, the light flashing signal, and the light winking signal as input signals and not as power sources, said logic circuitry means responding to the output of said ringing detector means after a predetermined delay whereafter activating said ring control switch means, said motor switch means and said lamp switch means, said logic circuitry means having a predetermined time-out whereby local ringing and lamp excitation continue after said ringing voltage is removed, said logic circuitry means inhibiting said termination means, said ring control switch means and said motor switch means and activating said lamp switch means when an answered condition exists, said logic circuitry means activating said termination means when an on-hold condition exists, a capacitor being previously charged by the application of said signal A to initiate an on-hold condition, thereafter said logic circuitry means remaining in a latched state by holding on itself until an answered condition is re-established, and said logic circuitry means having a capacitor that is charged upon initiation of said on-hold condition whereafter said charged capacitor preventing drop out of said termination means due to momentary zero line current, said charged capacitor being discharged for releasing said termination means due to a predetermined time of zero line current.

2. The circuit of claim 1 wherein said line current detector means comprises a light producing diode of a first optical coupler which is connected to the output of a full-wave diode bridge, and electronic components such as resistors or diodes connected in parallel and/or series with the diode of said first optical coupler for producing a predetermined threshold response.

3. The circuit of claim 2 wherein said ringing detector means comprises a light producing diode of a third optical coupler connected in series with a zener diode and a resistor, and a full-wave diode bridge providing current direction from said pair to the diode of said third optical coupler and said zener diode via a resistor.

4. The circuit of claim 3 wherein said termination means comprises the transistor of a second optical coupler responsive to light, whereat the collector is connected to said zener diode, and whereat the emitter is connected to the diode of said third optical coupler via a resistor, one or a plurality of transistors such as NPN type responsive to the emitter or collector current of said second optical coupler, whereby one transistor switches a resistor between said pair via a full-wave diode bridge, and a plurality of resistors connected so as to bias the transistors either conducting or non-conducting.

5. The circuit of claim 4 wherein said ring control switch means comprises the transistor of a fourth optical coupler responsive to light, a plurality of resistors for current limiting or transistor biasing, a solid state switching component such as a silicon controlled rectifier responsive to the transistor of said fourth optical coupler, a group of electronic components such as two diodes and a resistor connected between the collector and the emitter of said fourth optical coupler for voltage protection, one or a plurality of capacitors and an inductor connected to the leads of said solid state switching component for the prevention of false triggering, and
a full-wave diode bridge connected between said switching component and the output terminals of said ring control switch means.

6. The circuit of claim 5 wherein the said motor switch means or the said lamp switch means comprises
a solid state switching unit such as a bilateral thyristor or triac for switching either positive or negative current,
a resistor connected to the control electrode of said switching unit for turning off bias current,
one or a plurality of capacitors and one or a plurality of resistors connected to the leads of said switching unit for false response prevention,
a resistor connected to the control lead of said switching unit for initiating current limiting, and
a signal mixing OR gate or NOR gate for producing an initiating output control current for said switching unit, one example using a diode OR gate in said motor switch means and resistor plus transistor NOR gate in said lamp switch means.

7. The circuit of claim 6 wherein said logic circuitry means comprises
the transistor of said first optical coupler responsive to light,
the diode of said second optical coupler producing light from a bias current,
the transitor of said third optical coupler responsive to light,
the diode of said fourth optical coupler producing light from a bias current,
a plurality of transistors such as NPN and PNP types biased to be switched either conducting or nonconducting,
a plurality of resistors for biasing the transistors to be either conducting or non-conducting,
a plurality of capacitors connected to a plurality of resistors to produce time delays,
a plurality of diodes connected so as to bias the transistors with a predetermined current direction
a time-out sub-circuit responsive ot the transistor of said third optical coupler, a capacitor connected to a plurality of resistors for producing a predetermined turn-on delay and a predetermined time-out delay, one example of said time-out sub-circuit including a differential amplifier with two NPN transistors, another NPN transistor, two PNP transistors and the transistor of said third optical coupler, said time-out sub-circuit including the diode of said fourth optical coupler, a capacitor connected to a plurality of resistors for filtering and lamp flashing signal, and
an on-hold condition sub-circuit responsive to the transistor of said first optical coupler, a previously charged capacitor supplying initiating transistor current for said first optical coupler to initiate an on-hold condition, a capacitor connected to a plurality of resistors for producing a predetermined turn on delay and a predetermined turn off delay, said on-hold condition sub-circuit including the diode of said second optical coupler, a capacitor connected to a plurality of resistors for filtering the lamp winking signal, an example of said on-hold condition sub-circuit including two NPN transistors, two PNP transistors and the transistor of said first optical coupler.

* * * * *